(12) United States Patent
Bunker

(10) Patent No.: US 8,561,343 B2
(45) Date of Patent: Oct. 22, 2013

(54) PEST CONTROL METHOD AND APPARATUS

(76) Inventor: Brett Bunker Bunker, Kent City, MI (US)

( * ) Notice: Subject to any disclaimer, the term of this patent is extended or adjusted under 35 U.S.C. 154(b) by 0 days.

(21) Appl. No.: 13/567,578

(22) Filed: Aug. 6, 2012

(65) Prior Publication Data

US 2012/0312288 A1 Dec. 13, 2012

Related U.S. Application Data

(63) Continuation of application No. 13/231,577, filed on Sep. 13, 2011, now Pat. No. 8,234,811, which is a continuation of application No. 12/146,436, filed on Jun. 25, 2008, now Pat. No. 8,024,889.

(51) Int. Cl.
*A01M 29/12* (2011.01)

(52) U.S. Cl.
USPC .............................. 43/126; 102/267

(58) Field of Classification Search
USPC ................. 102/367, 368, 370, 334, 502, 512; 43/126, 132.1, 107, 131, 1; 124/4, 5, 6, 124/7
See application file for complete search history.

(56) References Cited

U.S. PATENT DOCUMENTS

| | | | |
|---|---|---|---|
| 2,028,217 A | 1/1936 | Huffman | |
| 2,373,363 A | 4/1945 | Hubert | |
| 3,095,867 A | 7/1963 | Kiynna | |
| 4,923,119 A | 5/1990 | Yamamoto et al. | |
| 5,279,482 A | 1/1994 | Dzenitis et al. | |
| 5,315,932 A | 5/1994 | Bertram | |
| 5,375,848 A | 12/1994 | Coleman | |
| 5,503,839 A | 4/1996 | Saguchi et al. | |
| 5,611,165 A | 3/1997 | Blaha | |
| 5,857,281 A | 1/1999 | Bergquist et al. | |
| 5,898,125 A | 4/1999 | Mangolds et al. | |
| 5,988,036 A | 11/1999 | Mangolds et al. | |
| 6,001,346 A | 12/1999 | Delwiche et al. | |
| 6,102,301 A | 8/2000 | Tiedemann | |
| 6,216,960 B1 | 4/2001 | Aiba et al. | |
| 6,264,939 B1 | 7/2001 | Light et al. | |
| 6,675,789 B2 | 1/2004 | Pearce et al. | |
| 6,772,694 B1 | 8/2004 | Pearce, III et al. | |
| 6,857,579 B2 | 2/2005 | Harris | |
| 7,076,914 B1 | 7/2006 | Howse | |
| 2004/0168363 A1 | 9/2004 | Baker | |
| 2005/0199740 A1 | 9/2005 | Harris, Jr. | |
| 2006/0094573 A1 | 5/2006 | Weck | |
| 2008/0011878 A1 | 1/2008 | Maples | |
| 2008/0044446 A1 | 2/2008 | McKibben | |
| 2009/0148399 A1 | 6/2009 | Bette | |
| 2010/0126483 A1 | 5/2010 | Makowski | |

OTHER PUBLICATIONS

Gut, L.J. et al., "Behaviour-modifying Chemicals: Prospects and Constraints in IPM," *Integrated Pest Management: Potential, Constraints and* Challenges, pp. 73-121, 2004.

*Primary Examiner* — Benjamin P Lee
(74) *Attorney, Agent, or Firm* — Kagan Binder, PLLC

(57) ABSTRACT

An apparatus to project toward a tree to disburse a pheromone, comprising: a releaser removably adjacent to a capsule via an extension; whereby said releaser and said capsule are disposed adjacent to each other in a deployable state, then the releaser separates from the capsule but is still connected via said extension whereby inertia causes said releaser to move away from said capsule into an attachment state, and related methods of applying a pheromone onto a tree branch.

5 Claims, 7 Drawing Sheets

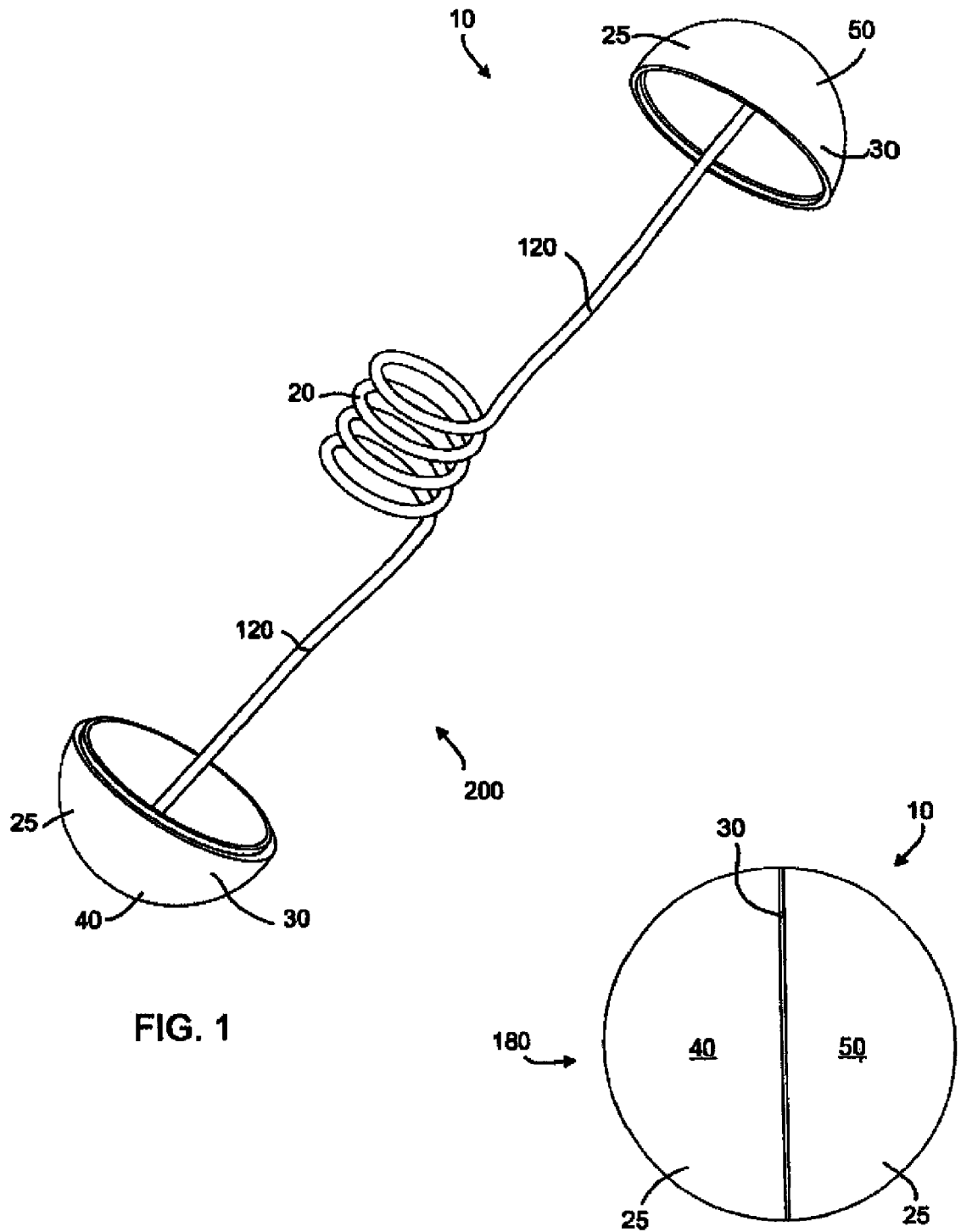

PEST CONTROL METHOD AND APPARATUS

CROSS-REFERENCE TO RELATED APPLICATION

This application is a continuation of U.S. Ser. No. 13/231,577, filed Sep. 13, 2011, now U.S. Pat. No. 8,234,811 titled PEST CONTROL METHOD AND APPARATUS, which is a continuation of Ser. No. 12/146,436, filed Jun. 25, 2008, now U.S. Pat. No. 8,024,889 titled PEST CONTROL METHOD AND APPARATUS, both of which are incorporated herein by reference in their entireties.

GOVERNMENT RIGHTS

This invention was not made with Government support under. The Government does not have any rights in this invention.

BACKGROUND OF THE INVENTION

Pheromones are released in agricultural environments, such as orchards and farms, to control insect reproduction and insect population so that plants and vegetation growth can be enhanced. In some cases, the pheromones are disposed in the upper ⅓ of trees to decrease invading insects in fruit crops, such as apples.

A pheromone is a chemical substance that is usually produced by an animal and serves especially as a stimulus to other individuals of the same species for one or more behavioral responses. Pheromones can be used to disrupt mating of invading insects by dispensing the pheromones or the pheromone scent in the air, so the males' cannot locate the females, which disrupts the mating process. Pheromones can be produced by the living organism, or artificially produced. This pest control method does not employ insecticides, so the use of pheromones is safer for the environment, and for living organisms.

Currently, the relevant art includes tying pheromones onto branches by use of the pheromones being imbedded within "twisty-tie" like products. Pacific Biocontrol Corporation, of Litchfield Park, Ariz. (pacificbiocontrol.com), makes and sells these types of pheromone products. These products require the user to manually, or by means of a rod-like extension, twist each product onto a branch, like one would apply the twisty-tie to close a trash bag. This is a labor intensive practice, especially for large orchards.

As can be seen, there is a need for faster way to apply such pheromone systems

SUMMARY OF THE INVENTION

One aspect is an apparatus to project toward a tree to disburse a pheromone, comprising: a releaser (20) removably adjacent to a capsule (25) via an extension (120); whereby said releaser (20) and said capsule (25) are disposed adjacent to each other in a deployable state (180), then the releaser (20) separates from the capsule (25) but is still connected via said extension (120) whereby inertia causes said releaser (20) to move away from said capsule (25) into an attachment state (200).

Another aspect is a method of applying a pheromone onto a tree branch, comprising: positioning a releaser (20) to a first end (122) of an extension (120);

positioning a capsule (110) to a second end (124) of an extension (120); positioning the releaser (20) adjacent to the capsule (110) so that the member (10) is in a deployable state (180); projecting the member (10) in its deployable state (180) whereby inertia causes said releaser (20) to separate from said capsule (110) and form an attachment state (200).

These and other features, aspects and advantages of the present invention will become better understood with reference to the following drawings, description and claims.

BRIEF DESCRIPTION OF THE DRAWINGS

FIG. 1 is a pictorial view of one embodiment of a member of the present invention in a open position;

FIG. 2 is a pictorial view of the first embodiment of the member of the present invention in a closed position;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 9:
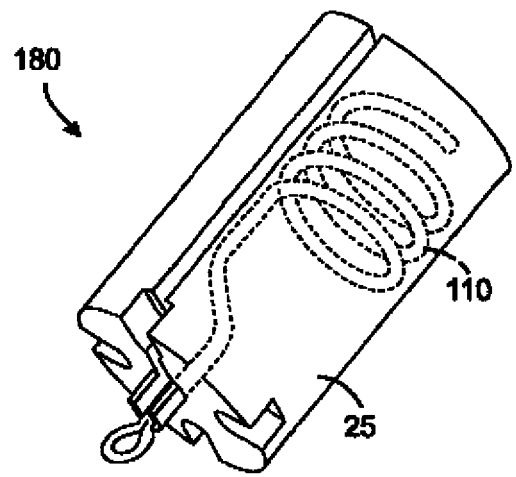
FIG. 9 is a pictorial of a third embodiment of the present invention with the releaser extended from the capsule.
Figure 10:
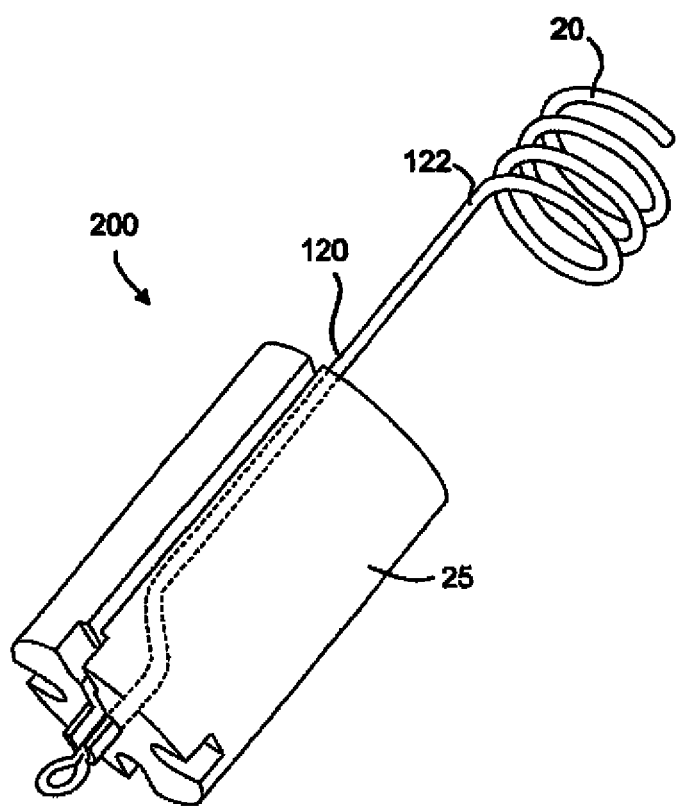
FIG. 10 is a pictorial of the third embodiment in a closed position, with the releaser disposed adjacent to the capsule.

REFERENCE NUMERALS 10 member
20 releaser
25 capsule
30 capsule type I
40 first capsule I portion
50 second capsule I portion
60 capsule type II
70 first capsule II portion
72 first groove
80 second capsule II portion
82 second groove
90 first capsule II hollow interior
100 second capsule II hollow interior
110 capsule III
120 extension
130 gun
180 deployable state
200 attachment state
300 positioning a releaser to a first end of an extension 310 positioning a capsule to a second end of an extension
320 positioning the releaser adjacent to the capsule
330 projecting the member in its deployable state FIG. 1 illustrates one embodiment on the present invention. The member 10 may include components including a releaser 20 connected to a first end 122, and a capsule 25 connected to a second end 124 of an extension 120 as illustrated in FIGS. 9 and 10.

In another embodiment, the releaser 20 may be disposed between two extensions 120, and each extension 120 may extend outwardly and connect to a capsule 25.

The capsule 25 may be of any shape and it may be hollow if the releaser 20 or if the releaser 20 and the extension 120 are to be disposed within the capsule. As an example, the capsule 25 may be of a type referred to herein as capsule type I, capsule type II, or capsule type III; which are substantially interchangeable.

FIGS. 1 and 2 illustrate a hollow spherical shaped capsule type I. The capsule type I 30 may have a first capsule type I portion 40 and a second capsule type I portion 50.

Figure 7:
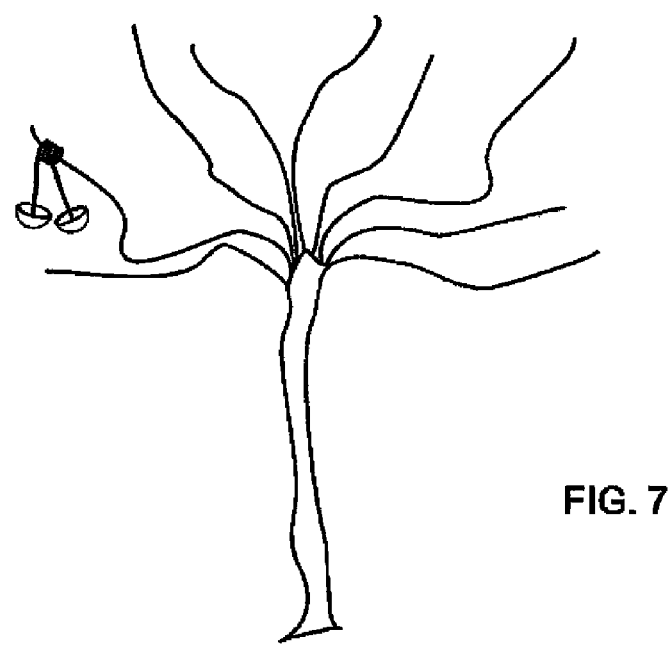
FIG. 7 is a pictorial view of a member being applied to a tree branch.

FIG. 2 illustrates a member 10 as a capsule type I 30 in its closed position. From the closed position, or deployable state 180, as illustrated at FIGS. 2, 4A, 4B, and 11, the member 10 can be propelled toward a tree; then due to inertia, the member 10 will separate from at least one of either capsule type I 30, capsule type II, 60, or capsule type III 110 to an attachment state 200, as illustrated in FIG. 7, from which the extension 120 may wrap around a branch, holding the releaser 20 in the air to release the desired pheromones. Then when member 10 contacts a tree branch, the member 10 may wrap around the branch, where it remains to deploy a pheromone into the air to disrupt the mating process of invading insects.

Figure 3:
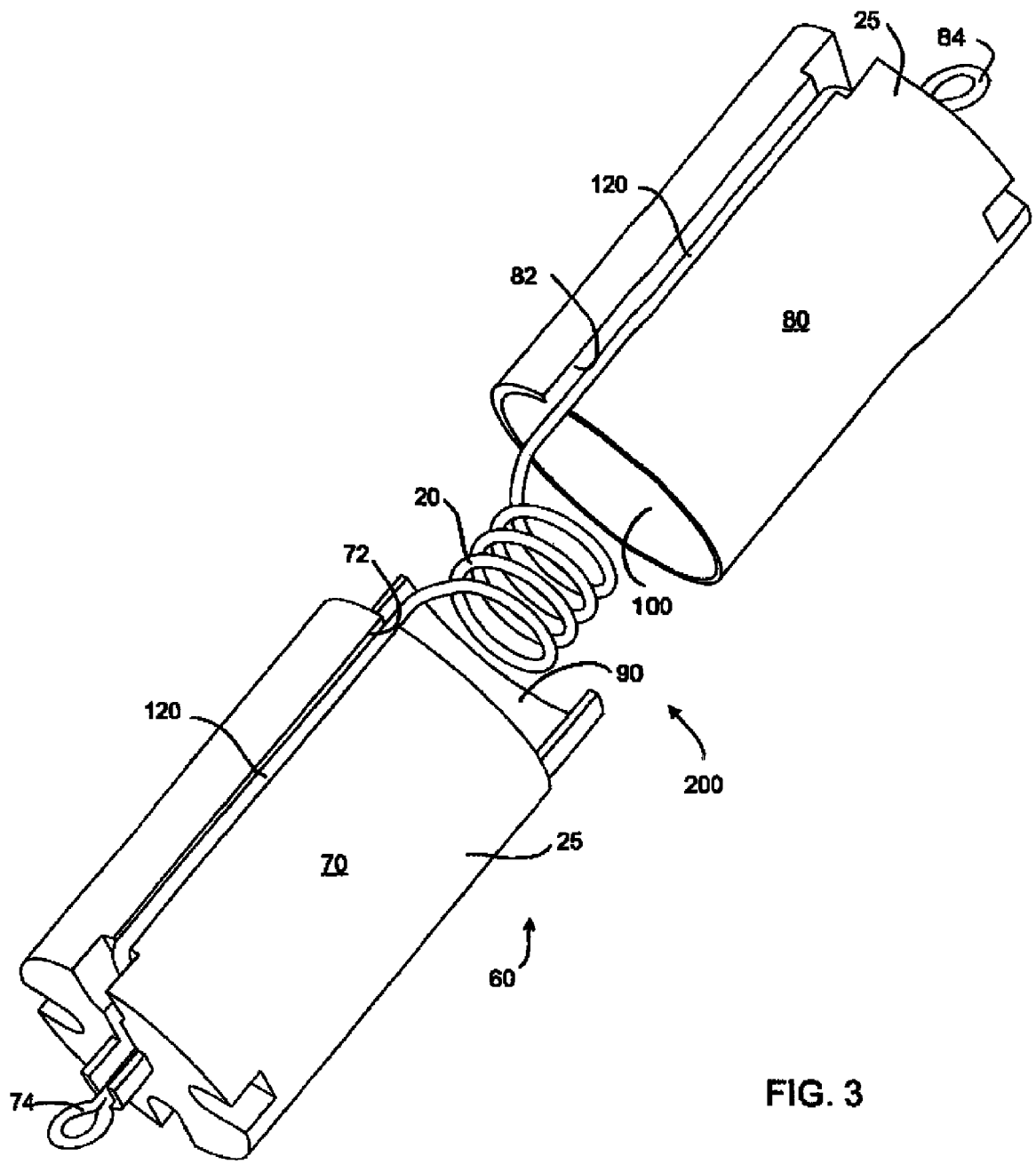
FIG. 3 is a pictorial view of a second embodiment of a member of the present invention in a open position.

FIG. 3 illustrates another type of member 10. This member 10 may be referred to as the capsule type II 60. The capsule type II 60 may have a first capsule II portion 70, and a second capsule II portion 80. The first capsule II portion 70 may have a first capsule II hollow interior 90. The second capsule II portion 80 may have a second capsule II hollow interior 100.

Figure 4A:
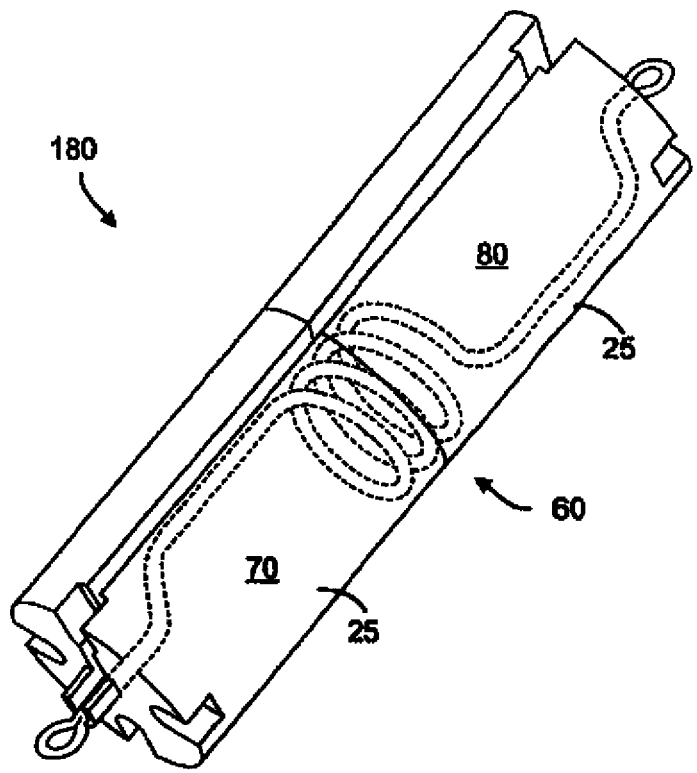
FIG. 4A is a pictorial view of the second embodiment of the member of the present invention in a closed position with the member within the capsule.
Figure 4B:
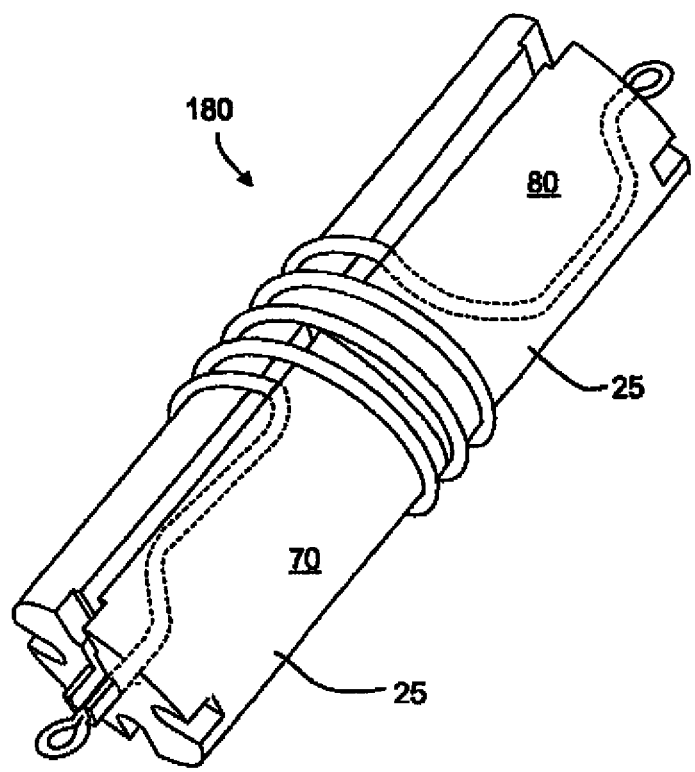
FIG. 4B is a pictorial view of the second embodiment of the member of the present invention in a closed position with the member on the outside of the capsule.
Figure 8:
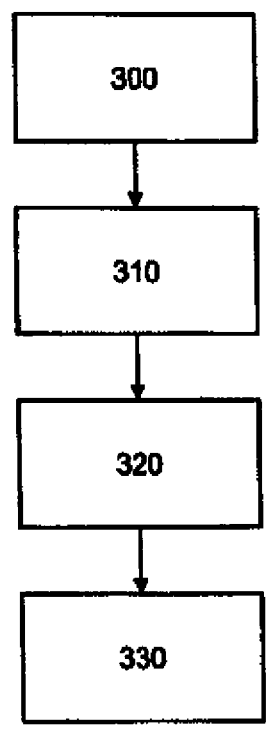
FIG. 8 is a pictorial of a schematic of a method of the present invention.

The capsule type II 60 can be closed as illustrated in FIGS. 4A and 4B. FIG. 4A illustrates the capsule type II 60 with the releaser 20 stowed inside the capsule type II displaced at least one of the first capsule II hollow interior 90 and the second capsule II hollow interior 100. The member 10 may be in this closed position for deployment when in the closed position, referred to herein as the deployment state 180, then after the member is deployed, it may separate to be in the attachment state 200, as illustrated in FIG. 7, then it may wrap around a branch as illustrated in FIG. 8.

FIG. 4B illustrates the capsule type II 60 with the releaser 20 disposed just outside of the capsule type II 60. The application may be the same as described as above, when the releaser 20 is stowed within the capsule type II.

Figure 5:
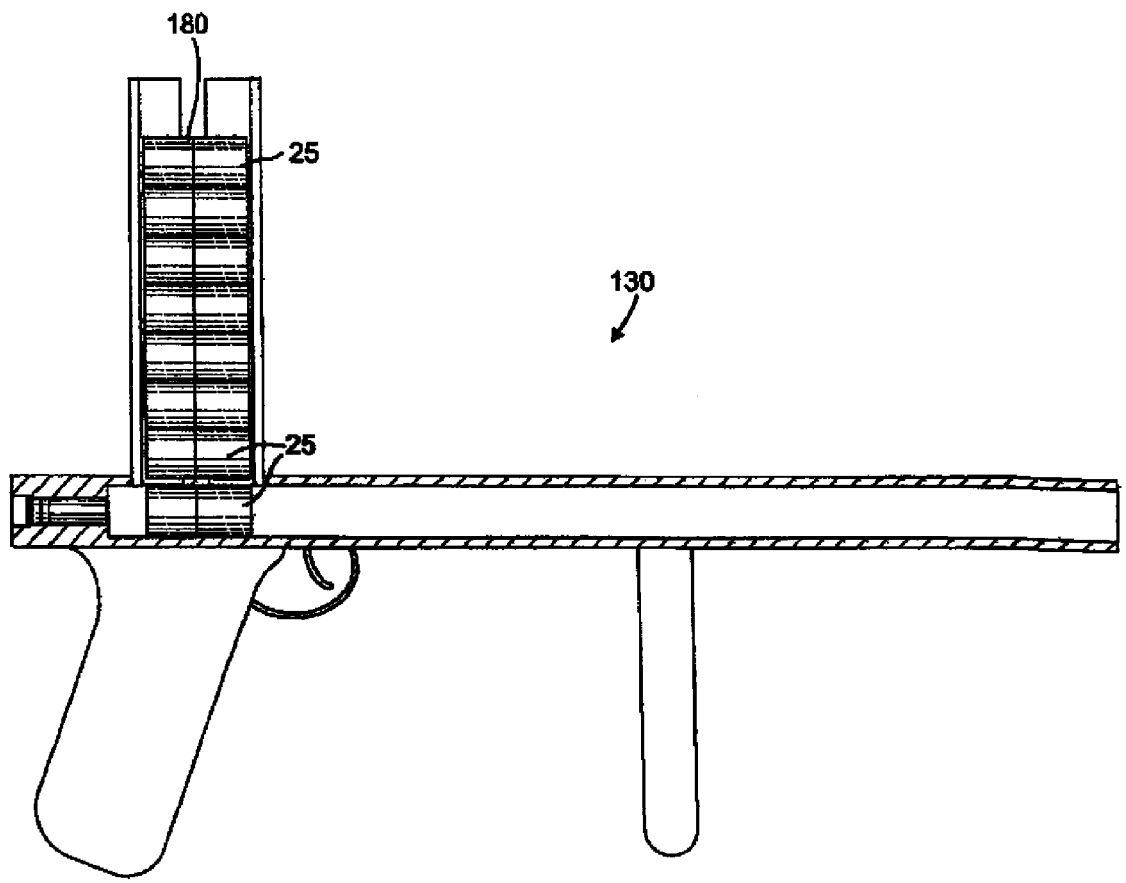
FIG. 5 is a pictorial view of a gun that may be used to deploy a member of the present invention.

FIG. 5 illustrates what the capsule 25; here the example used is capsule type II 60 may look like after deployment, and before wrapping around a branch. The releaser 20 may be disposed between two extensions 120, which may terminate at a first capsule II portion 70, and at the opposed end, a second capsule II portion 80. The first capsule II portion 70 may have a first groove 72 that extends linearly so that the extension 120 may be placed through the first groove 72, and tied at a distal end 74. Similarly, the second capsule portion II 80 may have a second groove 82 that extends linearly so that the extension 120 may be placed through the second groove 82, and tied secured at a distal end 84.

Figure 6:
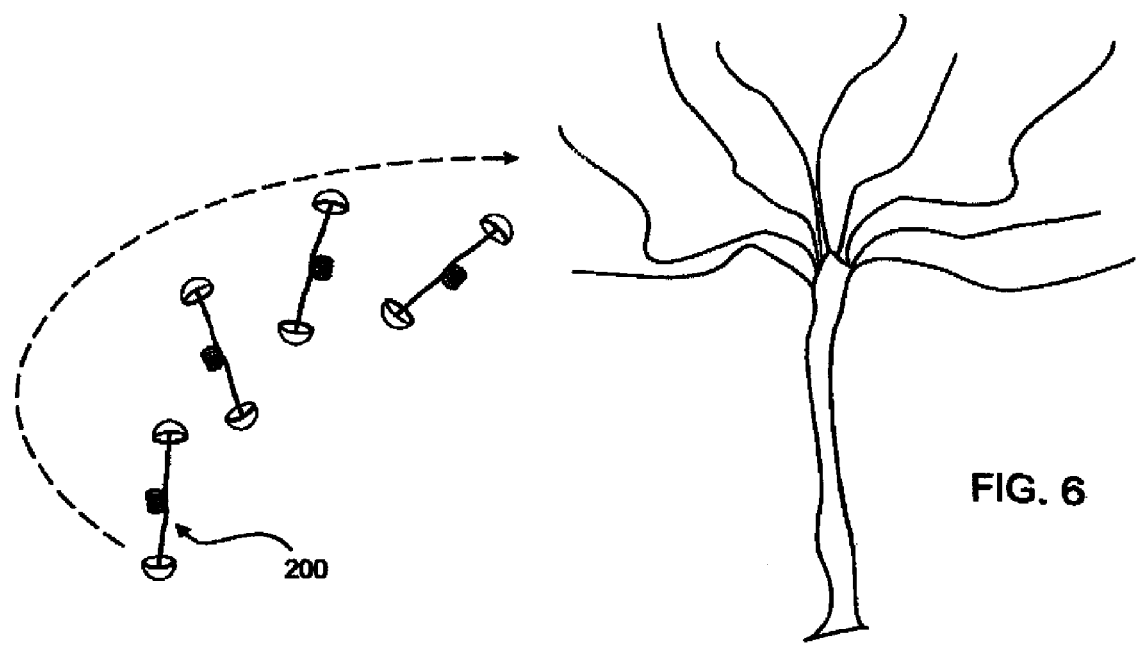
FIG. 6 is a pictorial view of a member being displaced toward a tree branch while in an attachment state.

FIG. 6 illustrates a gun 130 that may be used to deploy the member 10. For example, a user may point the gun 130 at a tree, and pull a trigger to project the member 10 from the gun toward a branch initially in the deployment state 180, as shown in FIG. 7, and then the member 10 may wrap around a tree branch as illustrated in FIG. 8 when in the attachment state 200.

Alternatively, a gun 130 need not be used. Any means of projecting or displacing the member 10 toward a branch will work. For example, one could even throw the member 10 toward the branch.

FIG. 9 is a schematic of the method of practicing the present invention. This illustrates the steps of a method of applying a pheromone onto a tree branch, comprising:

positioning (300) a releaser (20) to a first end (122) of an extension (120);

positioning (310) a capsule (110) to a second end (124) of an extension (120);

positioning (320) the releaser (20) adjacent to the capsule (110) so that the member (10) is in a deployable state (180); and projecting (330) the member (10) in its deployable state (180) whereby inertia causes said releaser (20) to separate from said capsule (110) and form an attachment state (200).

FIG. 10 illustrates another embodiment that uses a releaser 20 connected to a capsule III 110 via an extension 120. This may use less parts, and may be cheaper to produce.

Figure 11:
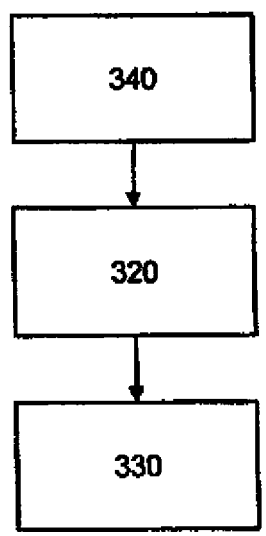
FIG. 11 is a pictorial of a schematic of a method of the present invention.

FIG. 11 illustrates the embodiment while the releaser 20 is disposed within the hollow capsule II 110, ready for deployment. Although FIG. 11 illustrates the releaser 20 disposed within the capsule III, it 20 may be disposed on the outside of the capsule III, as is illustrated in FIG. 4B.

It should be understood, of course, that the foregoing relates to exemplary embodiments of the invention and that modifications may be made without departing from the spirit and scope of the invention as set forth in the following claims.

The invention claimed is:

1. In combination, an apparatus to project toward a tree to disperse a pheromone, and a dispensing gun, the apparatus comprising:
a releaser removably adjacent to a capsule via an extension;
whereby said releaser and said capsule are disposed adjacent to each other in a deployable state, then the releaser separates from the capsule but is still connected via said extension whereby inertia causes said releaser to move away from said capsule into an attachment state, and
the dispensing gun comprises a handle and a barrel,
wherein the apparatus, with said releaser and said capsule disposed adjacent to each other in the deployable state, can be projected along a length of the barrel, and the dispensing gun comprises a magazine in communication with the barrel, the magazine adapted to contain multiple apparatus in the deployable state.

2. The combination according to claim 1 wherein
each apparatus has a proximal end, a distal end, sidewalls extending between the proximal end and a distal end, and a longitudinal axis extending between the proximal end and the distal end, and
the magazine contains the multiple apparatuses in the deployable state, with the longitudinal axes of the apparatuses parallel to a longitudinal axis of the barrel.

3. A pest control system comprising a pest control device and a dispensing gun, wherein:
the dispensing gun comprises a handle and a barrel;
the pest control device comprises:
a capsule comprising opposing capsule segments,
a tether comprising two ends, each end connected to an opposing capsule segment,
the capsule segments being capable of being engaged in a deployable state, the capsule segments capable of being separated to an attachment state wherein the capsule segments are attached by the tether, wherein the capsule, with the capsule segments engaged in the deployable state, can be projected along a length of the barrel the dispensing gun comprises a magazine in communication with the barrel, the magazine adapted to contain multiple capsules with capsule segments engaged in the deployable state.

4. A system according to claim 3 wherein the magazine is adapted to contain multiple capsules with capsule segments engaged in the deployable state, the capsules have a proximal end, a distal end, sidewalls extending between the proximal end and a distal end, and a longitudinal axis extending between the proximal end and the distal end, and the magazine contains the multiple capsules with capsule segments engaged in the deployable state, with the longitudinal axes of the capsules parallel to a longitudinal axis of the barrel.

5. A device according to claim 3 wherein the capsule comprise a base capsule segment and a rounded cap capsule segment.

\* \* \* \* \*